United States Patent
Lundby et al.

(10) Patent No.: US 6,351,650 B1
(45) Date of Patent: Feb. 26, 2002

(54) SYSTEM AND METHOD FOR FORWARD LINK POWER BALANCING IN A WIRELESS COMMUNICATION SYSTEM

(75) Inventors: Stein A. Lundby; Leonid Razoumov; Jack Holtzman, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/239,187

(22) Filed: Jan. 28, 1999

(51) Int. Cl.[7] .......................... H04Q 7/20; H04B 7/005
(52) U.S. Cl. .................. 455/522; 455/442; 455/69; 455/127; 455/561; 370/331
(58) Field of Search .................... 455/522, 442, 455/436, 422, 446, 67.1, 68, 69, 70, 92, 127, 561; 370/331.2

(56) References Cited

U.S. PATENT DOCUMENTS 6,075,974 A * 6/2000 Saints et al. ............ 455/69
6,119,010 A * 9/2000 Labedz .................. 455/446
6,119,018 A * 9/2000 Kondo ................... 455/522

FOREIGN PATENT DOCUMENTS

EP         0822672        2/1998

* cited by examiner

Primary Examiner—William Trost
Assistant Examiner—Philip J. Sobutka
(74) Attorney, Agent, or Firm—Phil R. Wadsworth; Kent D. Baker; Bruce W. Greenhaus

(57) ABSTRACT

Forward power control during a soft handoff in a wireless communication system is accomplished by tracking each power command (PC) transmitted from a mobile unit to two or more base station transceiver systems (BTSs). Each BTS may interpret power commands differently due to noise. However, the power commands are relayed to a selector along with additional data transmitted in a conventional fashion. The selector determines the power levels of each BTS and transmits power charge commands to maintain power balance between the BTSs. The BTSs may transmit each PC command to the selector or accumulate several PC commands and send a PC history to the selector. The selector generates a reference PC history, which may be one of the PC histories transmitted from a BTS, a combination thereof, the result of data processing on the one or more PC histories. Individual power change commands or the reference PC history is transmitted back to the BTS to adjust the transmitter output level of each BTS so that the BTSs are transmitting at compatible signal levels.

31 Claims, 6 Drawing Sheets

SYSTEM AND METHOD FOR FORWARD LINK POWER BALANCING IN A WIRELESS COMMUNICATION SYSTEM

FIELD OF THE INVENTION

The present invention is related generally to power control and, more particularly, to a system and method for power control in a wireless communication system.

BACKGROUND OF THE INVENTION

Power control in a wireless communication system is desirable for many reasons. For example, battery power conservation in a wireless communication device is optimized by controlling the transmitter output power such that the device does not transmit with excessive power. In addition, lowering the transmission output power decreases the interference to other wireless communication devices.

In certain wireless communication systems, such as a code division multiple access (CDMA) communication system, power control is absolutely essential. As those skilled in the art can appreciate, CDMA technology assigns statistically uncorrelated binary sequences, sometimes referred to as pseudo-random sequences, to each wireless communication device. The data signal from a CDMA device is modulated in a pseudo-random fashion using the pseudo-random sequences such that a receiver can demodulate using the same pseudo-random sequence to recover the data signal while any other signals are decoded as noise. Thus, an increase in the power of signals will also increase the noise at any given device.

If one CDMA device increased its transmission power, the signal for that particular device would increase, but at the cost of a decreased signal-to-noise ratio (SNR) for every other user. That is, an increased signal for one user results in increased noise for every other user and vice versa. To offer this decrease in SNR, each of the other users will have to increase their signal power, which in turn will increase the noise level for all users. It is therefore easy to appreciate the importance of each user providing the correct amount of signal power required and no more. As a result, it is essential to transmit at the lowest possible power level that will still allow acceptable quality of communication. In addition, the channel usually changes with time and the received power can change rapidly thus requiring a dynamic power control mechanism.

Power control in a forward link of a CDMA system is particularly difficult during handoff. In a "soft" handoff, the wireless device may be communicating with two or more base transceiver subsystems (BTS). If power control is not adequately regulated, the BTSs can transmit at radically different powers resulting in an overall system imbalance. Therefore, it can be appreciated that there is a significant need for a system and method that controls power in a wireless communication system. The present invention provides this, and other advantages, as will be apparent from the following description and accompanying figures.

SUMMARY OF THE INVENTION

The present invention is embodied in a system and method for the control of transmitter power on the forward link of a wireless communication system. A wireless communication device transmits data to a plurality of base station transceiver subsystems (BTSs). The data transmitted from the wireless communication device includes power control data, which is subject to noise and interference. Each base station transceiver receives the power control data and adjusts the output transmission power of its transceiver in accordance with the power control data. In addition, each base station transceiver stores the power control data, or data related thereto, in a power control history storage area.

The system further includes a selector that receives data from both base station transceivers, and further receives the power control history data from each base station transceiver. The selector selects the best data from one of the base station transceivers for further processing by the communication system. In addition, the selector generates a reference power control history based on one or both of the received power control histories. The reference power control history data is used to adjust the transmitter output power of the transceivers in one or both of the base station transceivers.

In one embodiment, the selector utilizes the power control history from the base station transceiver whose frame was selected for further processing. Alternatively, the selector may combine the power control history data from both base station transceivers to generate the reference power control history.

The selector may transmit a single power control command to a base station transceiver to adjust the transmitter output power thereof. Alternatively, the selector may transmit a series of incremental commands to adjust the transmitter output power of the base station transceiver. In yet another alternative embodiment, the selector may transmit the reference power control history data to the base station transceiver to allow the base station to generate its own power control commands.

DETAILED DESCRIPTION OF THE PREFERRED EMBODIMENTS

As discussed above, power control of each component in a code division multiple access (CDMA) communication system is vital to provide optimal operation for the entire system. As is well known in the art, CDMA wireless systems provide power control of all mobile units as well as a base transceiver subsystem (BTS). Data is transmitted from the BTS to the mobile unit on a "forward" link while data is transmitted from the mobile unit to the BTS on a "reverse" link. Conventional CDMA systems provide power control on both the forward link and the reverse link. The transmission power of the BTS is controlled on the forward link while the transmission power of the mobile unit is controlled on the reverse link.

Power control during a soft handoff is delicate because the mobile unit is communicating with more than one BTS. For purposes of the present invention, a soft handoff is defined herein as a simultaneous communication of a given mobile unit with two or more BTSs or with two or more sectors of the same BTS. The present invention provides power control in the forward link during a soft handoff. However, the power control system of the present invention may be used at other times to control and balance transmission power in a wireless communication system.

Figure 1:
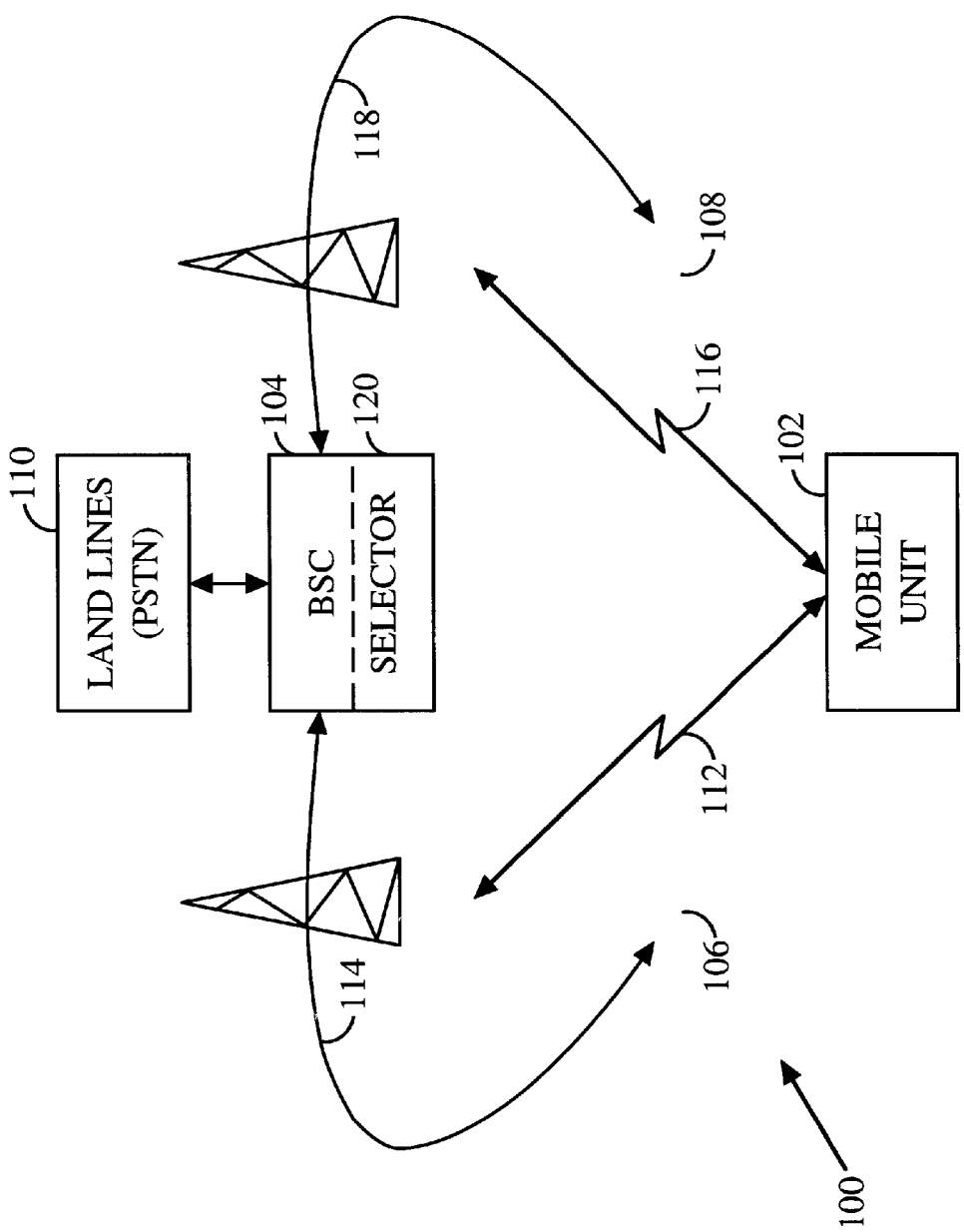
FIG. 1 illustrates the operation of a wireless communication system during a two-way handoff process.

The present invention is embodied in a system 100 illustrated in FIG. 1. A mobile unit 102 is communicating with a base station controller (BSC) 104 via a base transceiver subsystem (BTS) 106 and/or a BTS 108. A wireless communication link 112 couples the mobile unit 102 with the BTS 106. It should be understood that the wireless communication link 110 includes both the forward link and the reverse link. The BTS 106 communicates with the BSC 104 via a conventional bidirectional communication link 114 in a well-known fashion. The BSC 104 is coupled to a land line 110, such as a public switched telephone network (PSTN). The operation of the BSC 104 in communicating via the land line 110 is well known and need not be described in greater detail herein.

FIG. 1 also illustrates a wireless communication link 116 between the mobile unit 102 and the BTS 108. It should be understood that the wireless communication link 116 includes both the forward link and the reverse link. The BTS 108, in turn, communicates with the BSC 104 via a conventional bidirectional communication link 118. The system 100 of the present invention is particularly useful during a soft handoff because it provides a technique for balancing transmission power of the BTS 106 and the BTS 108. For a more complete understanding of the present invention, the following description will assume that the mobile unit 102 initially communicates with the BSC 104 via the BTS 106. As the mobile unit 102 moves in the general direction of the BTS 108, the wireless communication link 116 will be established. Under these circumstances, the mobile unit 102 is communicating with both the BTS 106 and the BTS 108. While the mobile unit 102 is communicating with both the BTS 106 and the BTS 108, elements within the BSC 104 analyze the data received from each BTS to determine which BTS is most appropriate for continued communication with the mobile unit.

The BSC 104 includes a selector 120 which analyzes data being transmitted from the BTS 106 and the BTS 108. In an exemplary embodiment, the selector 120 analyzes data frames transmitted from the BTS 106 and the BTS 108 during a soft handoff to determine which BTS is the most appropriate for continued communication with the mobile unit 102. The operation of the selector 120 is well known in the art, and need not be described in greater detail herein. However, as will be described in greater detail below, the selector 120 also analyzes a power control (PC) history from each BTS and will select a power level based on one or more of the PC histories. The selector 120 further transmits power adjustment commands to one or more BTS so as to more closely balance power transmitted from each BTS to the mobile unit 102. The operation of the selector 120 to analyze the PC history will be discussed in greater detail. In an alternative embodiment, the selector 120 analyzes the PC histories from each BTS 106 and 108 and transmits power adjustments commands to both BTSs. In yet another alternative embodiment, there are no PC histories. Instead, each BTS 106 and 108 transmits the received PC command to the selector 120, which analyzes the PC commands and sends power adjustment commands to the BTSs 106 and 108 after the receipt of one or more PC commands.

The mobile unit 102 controls the transmission power of the BTS 106 on the forward link of the wireless communication link 112. This is accomplished in a known fashion by transmitting PC commands from the mobile unit 102 to the BTS 106. The PC commands are usually embedded in frames containing data to be transmitted. In a typical CDMA system, each frame includes 16 independent PC commands. Each PC command may be in the form of a single bit (i.e., a PC bit) or multiple its. The BTS 106 responds to each PC bit by adjusting its transmission power accordingly. As is well known in the art, the voice data is encoded using error detection and/or error correction data to enhance operational performance. However, to minimize processing overhead, the PC bits are not usually encoded. When the BTS 106 receives a strong signal from the mobile unit 102, the PC bits are generally received without error. However, as the mobile unit 102 changes location with respect to the BTS 106, a soft handoff may be necessary.

The PC bits may be incorrectly interpret both the BTS 106 and the BTS 108 due to noise. For example, the mobile unit 102 may broadcast a plurality of PC bits to instruct the BTS 106 to increase its power. However, due to an erroneous decoding, the BTS 108 may interpret those same PC bits as power decrease commands. Under these circumstances, the BTS 106 would increase its transmission power while the BTS 108 would decrease its transmission power by a corresponding amount. The result is a power imbalance between the BTS 106 and the BTS 108. If no corrective system exists, the imbalance will grow out of control. In accordance with the principles of the present invention, the selector 120 will examine a predetermined number of previous PC bits and send power adjustment commands to one or both BTS 106 and BTS 108 so as to balance the transmission power on the forward link.

Figure 3:
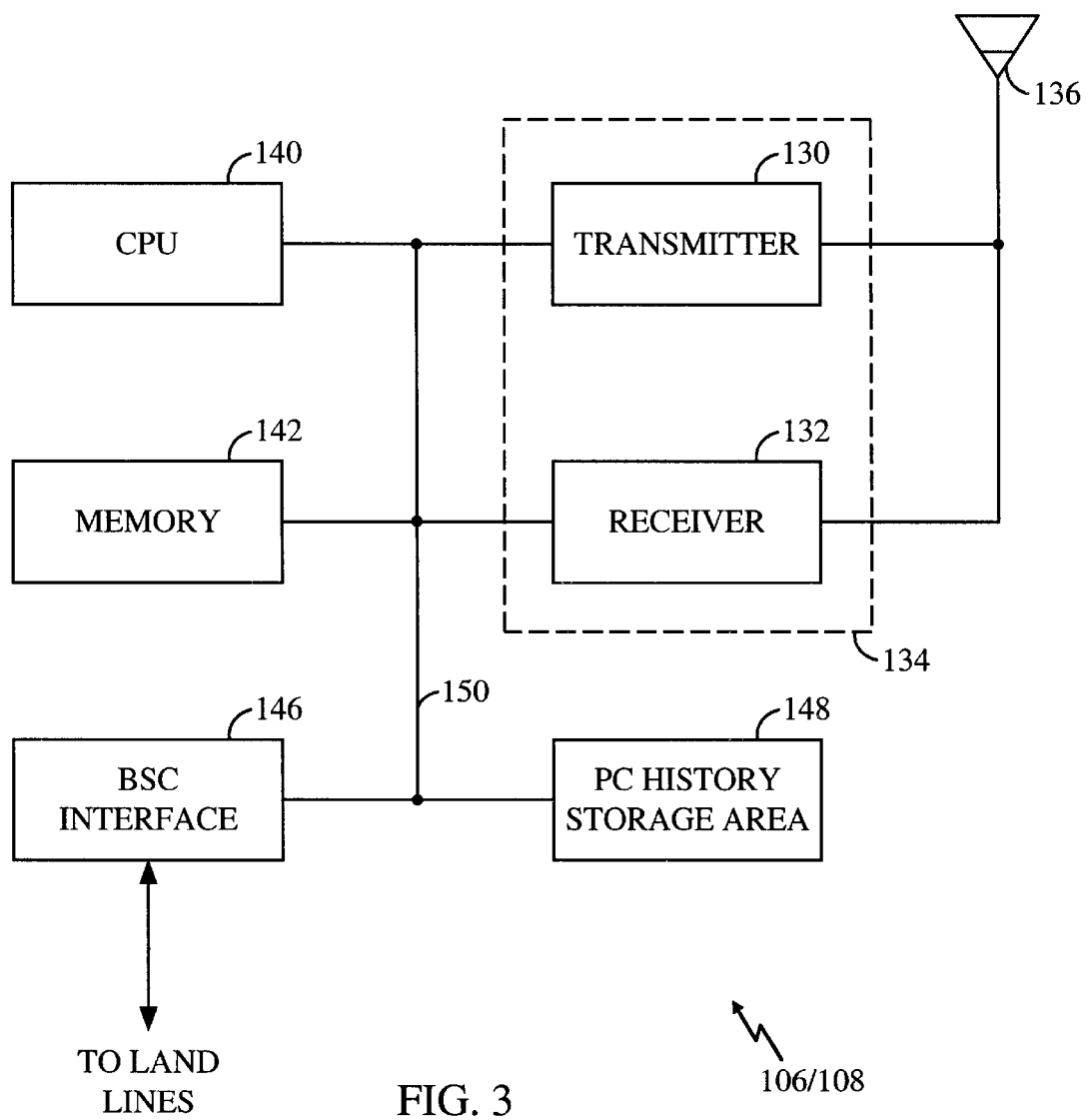
FIG. 3 is a functional block diagram of a base station transceiver system implementing the power control of the present invention.

FIG. 3 is a functional block diagram illustrating components of the BTS 106. It should be understood that the BTS 108 contains identical or similar components and operates in essentially the same manner as the BTS 106. The BTS 106 includes a transmitter 130 and a receiver 132, which are used to establish and maintain the wireless communication link 112 with the mobile unit 102. The transmitter 130 and receiver 132 may be combined to form a transceiver 134. The transmitter 130 and receiver 132 are coupled to an antenna 136. The operation of the transmitter 130 and receiver 132 are well known in the art and need not be described in detail. The operation of the system 100 to control the power level of the transmitter 130 will be discussed in greater detail below.

In an exemplary embodiment, the BTS 106 also includes a central processing unit (CPU) 140 to control operation of the BTS 106. For example, the CPU 140 may be used to decode data received from the mobile unit 102 and to provide the necessary error detection and/or correction. The CPU 140 also performs other functions well known in the art, which need not be described herein.

The BTS 1 also includes a memory 142, which may include random access memory (RAM), read-only memory (ROM), nonvolatile memory, and the like. The memory 142 may provide instructions for execution by the CPU 140 and is also used for data storage. The operation of the memory 142 is well known in the art, and will not be described in greater detail herein.

Figure 2:
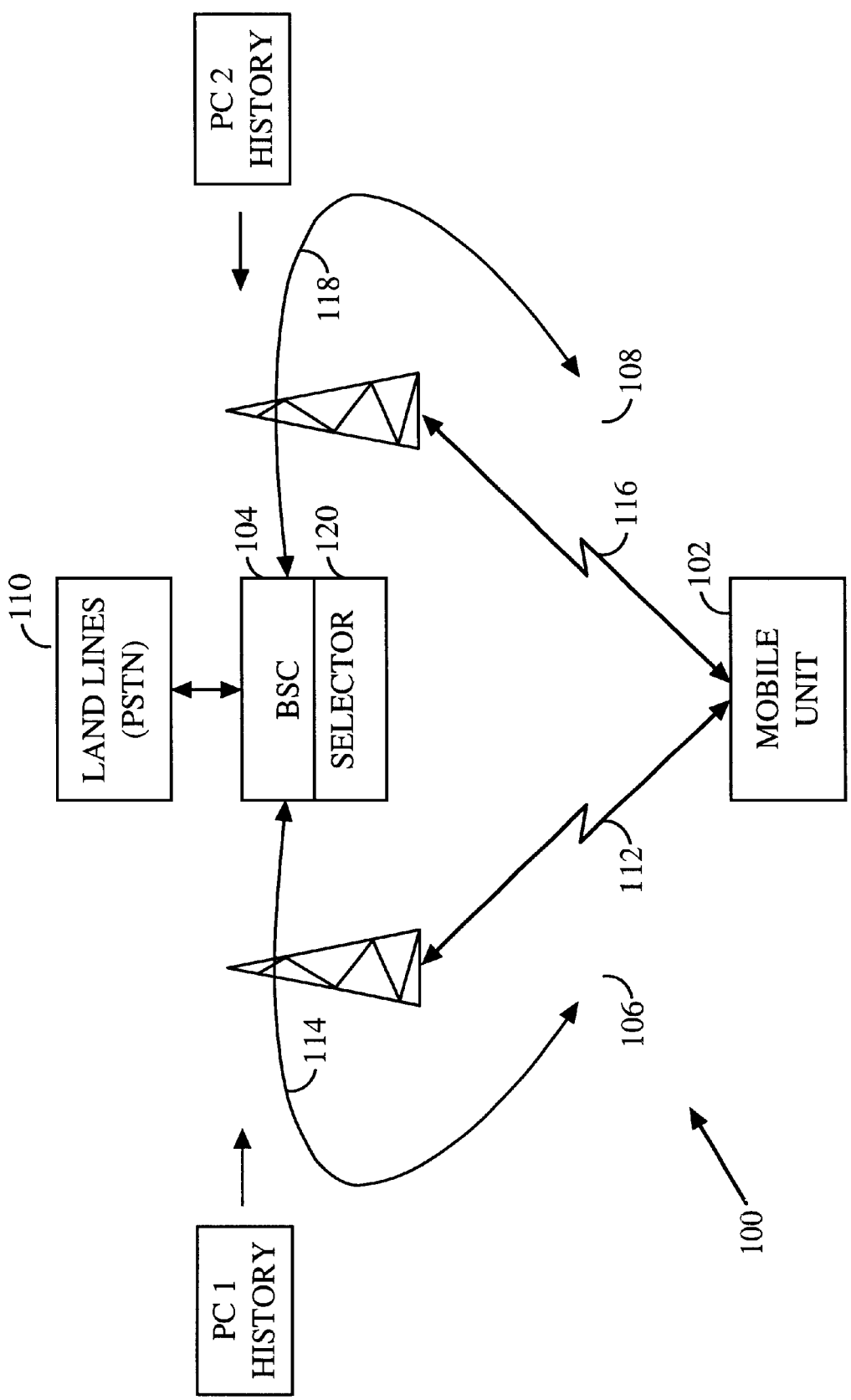
FIG. 2 is a diagram illustrating the control of power during the handoff process illustrated in FIG. 1.

The BTS 106 also includes a BSC interface 146 to control communication between the BTS 106 and the BSC 104 (see FIG. 1) via the communication link 114. The operation of the BSC interface 146 is well known in the art, and need not be described in greater detail herein. In addition to conventional operation, the BSC interface 146 transmits PC history data from the BTS 106 to the selector 120, as illustrated in FIG. 2. As discussed above, the BTS 106 receives PC commands from the mobile unit 102. In an exemplary embodiment, a predetermined number of the PC commands are stored in a PC history storage area 148 and forwarded to the selector 120 via the communication link 114. Alternatively, the PC commands can be forwarded directly to the BSC 104 and stored locally in the BSC.

The various components are coupled together by a bus system 150. The bus system 150 may include a data bus, power bus, control bus, and the like. However, for the sake of clarity, these various busses are illustrated in FIG. 3 as the bus system 150.

The operation of the system 100 to control power on the forward link may now be described in greater detail. As previously discussed, the mobile unit 102 transmits a plurality of PC bits (typically 16) in a data frame. Each of the PC bits is stored in the PC history storage area 148 in the BTS 106 and the BTS 108. During the handoff process, the BTS 106 transmits data from the PC history storage area 148 to the selector 120 via the communication link 114. Similarly, the BTS 108 transmits data from the PC history storage area 148 to the selector 120 via the communication link 118.

In conventional CDMA operation, a data frame transmitted from the mobile unit 102 to the BTS 106 includes 16 independent up/down PC bits. The BTS 106 responds to the PC bits by increasing or decreasing the power of the transmitter 130. As is known in the art, the output power of the transmitter 130 may be incremented in predetermined steps. For example, the transmitter 130 may be controlled in one quarter decibel (dB) increments, one half dB increments, or one dB increments. Depending on the predetermined increment level, the transmitter 130 increases or decreases the power transmission in response to the PC bits in the data frame.

In an exemplary embodiment, the PC history storage area 148 stores the 16 PC bits from the current data frame. The selector 120 uses the data in the PC history storage area 148 to generate a reference PC history. The reference PC history is used to determine differences in transmission levels between the BTS 106 and the BTS 108. This operation will be described in greater detail below. Alternatively, the PC history storage area 148 may contain more or fewer PC commands. For example, the PC history storage area 148 may contain data for the last several frames. The present invention is not limited by the specific number of PC commands stored in the PC history storage area 148.

To understand the operation of the system 100 to control forward power during a soft handoff, the handoff process and errors in PC bits shall be briefly described. The mobile unit 102 communicates with the BTS 106 and BTS 108 in a conventional fashion. That is, data frames are exchanged between the mobile unit 102 and the BTS 106 and BTS 108. In the example described above, the mobile unit 102 is initially communicating solely with the BTS 106. As the mobile unit 102 changes location and begins to communicate with the BTS 108, the frames containing the PC bits are received by both the BTS 106 and BTS 108. As described above, the 16 PC bits from each frame are stored in the PC history storage area 148 in each of the BTS 106 and 108. However, the data stored in the PC history storage area 148 in the BTS 106 may differ from the data stored in the PC history storage area 148 of the BTS 108. As discussed above, the PC bits transmitted without error detection and/or correction and are thus subject to noise. As a result of this noise, the BTS 106 may interpret the PC bits differently than the BTS 108. As a result, the transmitter 130 in the BTS 106 may transmit at a significantly different power level than the transmitter 130 in the BTS 108. The frames received by the BTS 106 and 108 are forwarded to the selector 120 via the communication links 114 and 118, respectively. The selector 120 selects the best frame for transmission via the land line 110. The "best" frame is selected using conventional techniques. For example, the selector 120 may select the best frame based on error detection data. As is known in the art, the frame includes a cyclic redundancy check (CRC) or other error detection/correction data that is used to check the accuracy of the data within the frame. The selector 120 will select the frame whose CRC indicates valid data. If the CRC indicates that both frames are good, the selector 120 may use other techniques, such as selecting the signal with the highest SNR. Various techniques used to select the best frame are known in the art. The present invention is not limited by the specific technique used to select the best frame.

In addition to selecting the best frame, the selector 120 generates the reference PC history. In an exemplary embodiment, the selector 120 selects the PC history associated with the best frame and uses that data as the reference PC history to generate power control commands for the remaining BTS. For example, if the selector 120 selects the frame from BTS 106, the presumption is that the PC commands associated with the frame from the BTS 106 are the most reliable. Accordingly, the selector 120 may transmit power control commands to alter the transmitter 130 in the BTS 108 and thereby correct for deviations in the transmission power levels between the BTS 106 and the BTS 108.

The selector 120 may transmit the power change commands to the BTS 108 in a variety of different manners. For example, Table 1 below provides an example of PC histories from data frames transmitted from the BTS 106 and the BTS 108.

TABLE 1

SAMPLE PC HISTORIES

| PC Bit | PC 1 History | PC 2 History |
|---|---|---|
| 1 | +1 | +1 |
| 2 | −1 | +1 |
| 3 | −1 | −1 |
| 4 | +1 | +1 |
| 5 | +1 | −1 |
| 6 | +1 | −1 |
| 7 | −1 | −1 |
| 8 | +1 | +1 |
| 9 | −1 | −1 |
| 10 | +1 | +1 |
| 11 | +1 | −1 |
| 12 | −1 | −1 |
| 13 | +1 | +1 |
| 14 | −1 | −1 |
| 15 | +1 | −1 |
| 16 | −1 | +1 |
|  | +2 | −2 |

In the example illustrated in Table 1, a value of +1 is used to indicate a PC bit that resulted in a power increase, while a value of −1 is used to indicate the value of a PC bit that resulted in a decrease in power. As those skilled in the art can appreciate, the PC bits can be represented in a variety of different manners. For example, a logic 1 may be used to indicate a power increase while a logic 0 is used to indicate a power decrease. Alternatively, a logic 1 may be used to indicate a power decrease, and a logic 0 used to indicate a power decrease. In yet another alternative embodiment, multiple PC bits may be used. The present invention is not limited by the specific form in which the PC bits occur. Table 1 is intended only to illustrate one of several possible techniques used to track the PC history and thereby determine the PC power level of the transmitters 130 in the BTS 106 and the BTS 108.

In the example illustrated in Table 1, the transmitter 130 in the BTS 106 was instructed to increase its power by a total of two incremental levels (e.g., one half dB increments). In contrast, the same data frame caused the transmitter 130 in the BTS 108 to decrease its transmission power level by two incremental levels (e.g., one half dB increments). As a result, the transmitter 130 in the BTS 106 is now transmitting four incremental levels higher than the transmitter 130 in the BTS 108. The present invention is designed to eliminate such variations in transmission power level.

In the present example where the frame from the BTS 106 was selected as the best frame, the PC history from the BTS 106 is selected as the reference PC history. Based on the sample PC histories illustrated in Table 1, it is clear that the transmitter 130 in the BTS 108 is four incremental power levels below the reference PC history (i.e., the PC 1 history). The selector 120 transmits a power change command to the BTS 108 to increase its power by four incremental levels. In an exemplary embodiment, the selector 120 simply transmits a single power change command instructing the BTS 108 to increase the output of the transmitter 130 by four incremental levels. Alternatively, the selector 120 may transmit four separate commands, with each command causing the transmitter 130 to increase its output power by one incremental level. In yet another alternate embodiment, the selector 120 may simply transmit the entire PC 1 history to the BTS 108 to allow the BTS 108 to calculate the difference in output levels of the transmitters and thereby generate its own power change commands. Other techniques may also be used satisfactorily with the system 100. The goal is to balance the output levels of the transmitters 130 and the BTS 106 and the BTS 108.

In yet anther alternative embodiment, the goal of the system 100 is to adjust the power level of the transmitters 130 and the BTS 106 and the BTS 108 so that each BTS has a matching ratio of the transmitted power to the total output power. This ratio may be represented by the formula $E_c/I_o$ where $E_c$ represents the transmitted power of the coded data and $I_o$ represents the total power spectral density. With this approach, each transmitter 130 is adjusted to compensate for a number of other users that may be communicating with the particular BTS.

In the example presented above, the PC history from the BTS 106 was chosen by the selector 120 as the reference PC history. However, the selector 120 may choose the PC history from the BTS 108 based on the factors described above. Alternatively, the selector 120 may combine the PC histories from the BTS 106 and the BTS 108 and use some combination as the reference PC history. In this embodiment, it may be necessary for the selector 120 to send data to both the BTS 106 and the BTS 108 so that each may adjust the output power of its respective transmitter 130.

While the above description relates to BTS 106 and BTS 108, those skilled in the art will appreciate that the principles of the present invention can be extended to one or more additional BTSs. The selector 120 generates a reference PC history based on one or more PC histories from the BTSs and transmits the reference PC history to each BTS. It should be noted that the selector 120 need not transfer the reference PC history to a BTS if that BTS was the sole source of the PC reference history. In one example presented above, the selector used the PC history from the BTS 106. In that event, the selector 120 need not transfer the reference PC history (i.e., the PC 1 history) to the BTS 106 since the output level of the transmitter 130 with the BTS 1 is already at the desired power level.

Figure 4A:
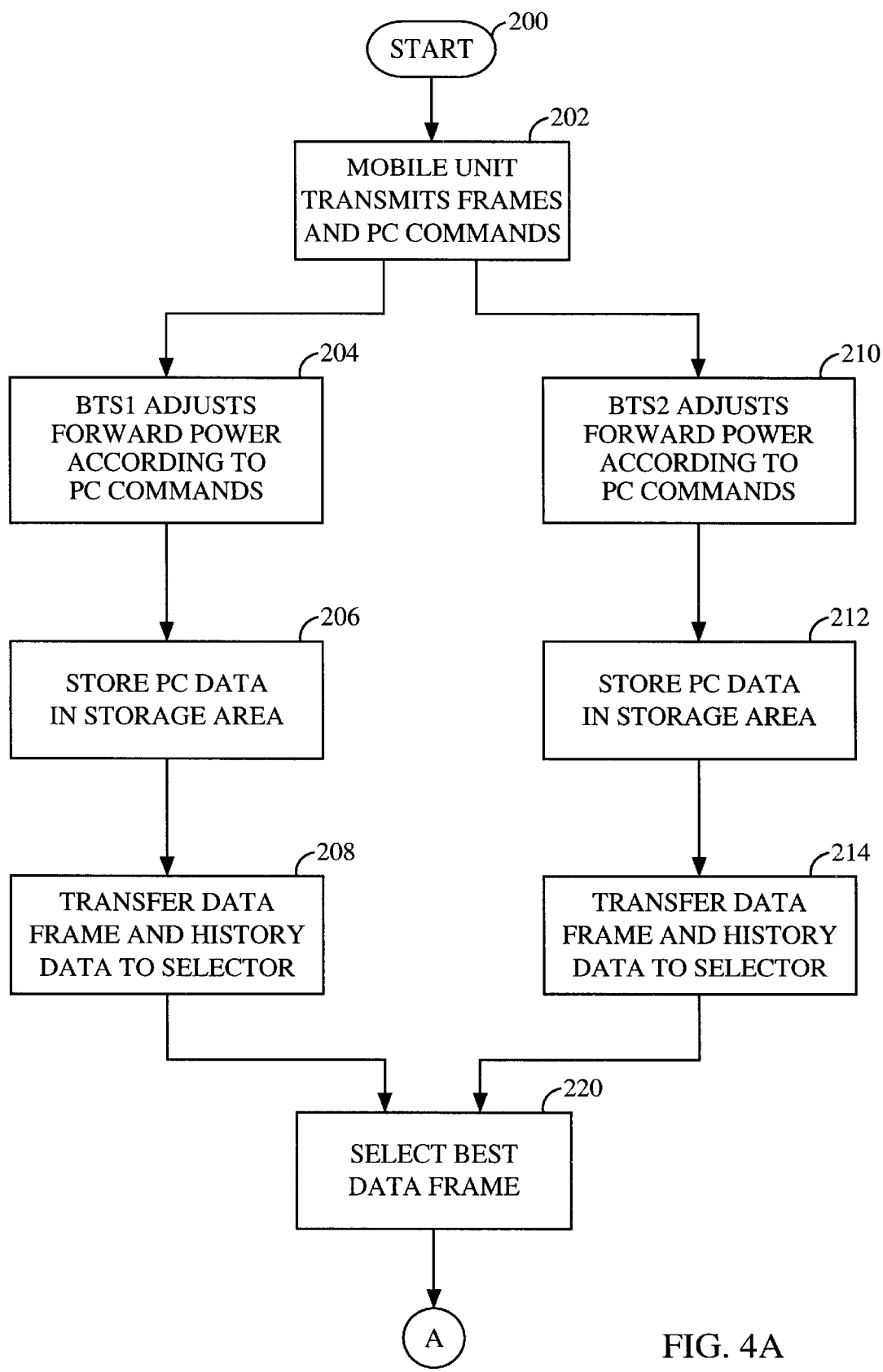
FIGS. 4A and 4B together form a flowchart illustrating the operation of the system of the present invention.
Figure 4B:
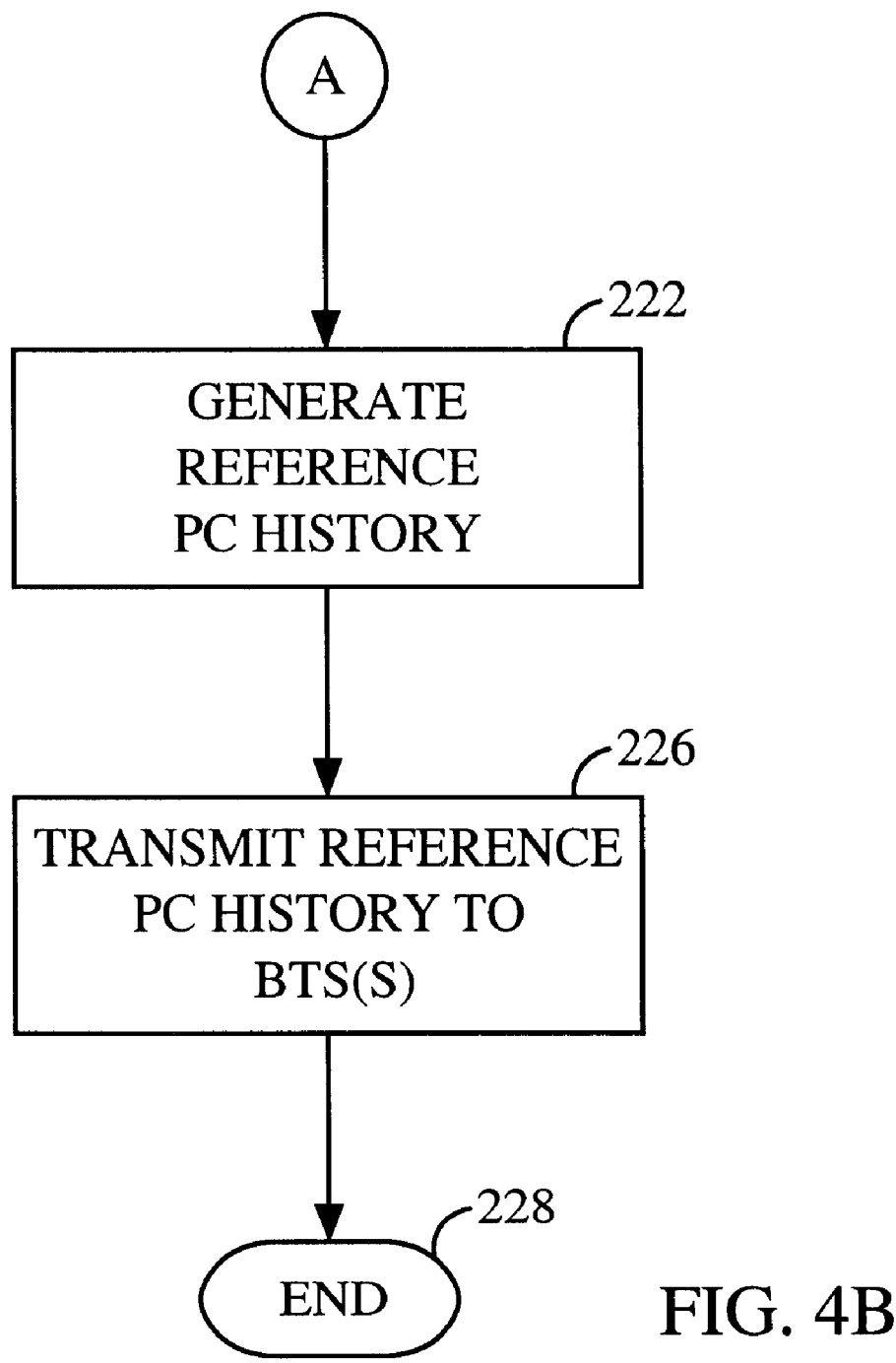

The operation of the system 100 is illustrated in the flow chart of FIGS. 4A and 4B. At a start 200, the mobile unit 102 (see FIG. 2) is communicating with the base station BTS 106 and the base station BTS 108. In step 202, the mobile unit 102 transmits data frames, which are received by both the BTS 106 and the BTS 108. As noted above, the frame includes data, such as voice data and PC bits.

In step 204, the BTS 106 adjusts the power of the transmitter 130 (see FIG. 3) to adjust the transmission power on the forward link. In step 206, the BTS 106 stores the PC bit in the PC history storage area 148. In step 208, the BTS 106 transfers the data frame and PC history data to the selector 120 via the communication link 114. It should be noted that the BTS 108 independently performs identical steps, illustrated in FIG. 4A as steps 210–214. That is, the BTS 108 adjusts the forward power (step 210), stores the PC data in the PC history storage area 148 within the BTS 108 (step 212) and transfers the data frame and PC history data to the selector 120 via the communication link 118 (step 214). As noted above, the actual data in the PC history storage areas may differ because the PC data transmitted by the mobile unit 102 is subject to noise and thus errors in detection by the BTS 106 and the BTS 108.

In step 220, the selector 120 selects the best data frame for transmission via the land line 110. Examples of some parameters used to select the "best" frame are discussed above. Those skilled in the art will appreciate that many known techniques exist to select the best frame. The operation performed in step 220 is intended to include any and all known techniques for selecting the best frame.

In step 222, illustrated in FIG. 4B, the selector 120 (see FIG. 2) generates a reference PC history. As discussed above, the reference PC history may be a single one of the PC histories transmitted from the BTS 106 and the BTS 108, or a combination thereof. Alternatively, the selector 120 may process the PC histories in some fashion to generate the reference PC history.

In step 226, the selector 120 (see FIG. 2) transmits the reference PC history to each BTS. As previously noted, if the reference history is selected from one of the PC histories (e.g., PC 1 history), the selector 120 need not transmit the reference PC history to the BTS (e.g., the BTS 106) since that BTS is already transmitting at the desired power level. The process ends at 228 with the transmitters 130 (see FIG. 3) of each BTS transmitting at identical power levels. As noted above, the system 100 can be adjusted such that the transmitters 130 transmit at identical power ratios.

In an alternative embodiment, the selector 120 (see FIG. 2) receives the PC histories from the BTS 106 and the BTS 108, but does not generate a reference PC history. Rather, the selector 120 determines the power level at each of the BTSs using the respective PC histories and sends power change commands to the BTS 106 and the BTS 108. In the example illustrated in Table 1 above, the selector 120 would send power change commands to the BTS 106 to decrease its power level two steps while the selector would send power change commands to the BTS 108 to increase its power by two steps. In another example, the PC history for the BTS 106 may indicate a power change of +2 while the PC history for the BTS 102 indicates a power change of +4. In this case, the selector 120 simply averages the results (average=+3) and transmits power change commands to each BTS to adjust the level accordingly. In this manner, the signal power at each BTS can be corrected to the desired level.

As noted above, the system 100 can be used to maintain two or more BTSs at the same power level. However, as those skilled in the art can appreciate, it may not be necessary to maintain each BTS at the same power level for a given mobile unit 102. For example, the mobile unit 102 may be receiving a stronger signal from one BTS (e.g., the BTS 106) and need only increase the power level from a different BTS (e.g., the BTS 108). In this embodiment, the system 100 need not maintain the signal power of each BTS at identical levels. Rather, the selector 120 sends power change commands to maintain the signal power at each BTS at a fixed power offset with respect to each other. In the example above, the BTS 108 may be maintained at a higher power level than the BTS 106. Those skilled in the art will appreciate that a power control offset of this nature allows optimization of a wireless system for all users by carefully controlling power levels and thereby minimizing noise for other mobile units.

Similarly, the system 100 may maintain the power level of the transmitters so that each BTS has a matching ratio of transmitted power to the total output power, as described above. The present invention is not limited by the particular power level adjustment used at each BTS. The principles of the present invention are also applicable to more than two BTSs.

In another alternative embodiment, each BTS can calculate its own power level and send data to the selector 120 indicating the present power level. This approach avoids the need for the PC history storage area 148 in each BTS. The operation of the selector 120 is essentially the same as described above. That is, the selector 120 determines the difference in power levels and sends power change commands to balance the power levels, maintain a desired power offset, or maintain a desired power ratio, as described above.

In an exemplary embodiment described above, the PC history is collected over the course of an entire data frame. As those skilled in the art can appreciate, with sixteen PC bits in a data frame, the power control between the mobile unit 102 and a given BTS (e.g., the BTS 106) results in a control loop operating at approximately 800 Hz. If the selector 120 waits for the PC history to be accumulated over an entire data frame, the control rate from the selector to the BTSs is only 50 Hz (1/16 of 800 Hz). In certain applications, the 50 Hz control rate from the selector is insufficient. Accordingly, the PC history can contain a few PC bits, which are transmitted to the selector 120 more frequently than once per data frame.

In an exemplary embodiment, each BTS transmits each PC bit to the selector 120 when it is received from the mobile unit 102 and does not store any data in the PC history storage area 148. Sending each PC bit to the selector 120 allows a much higher control rate between the selector and the BTSs. In this embodiment, the selector 120 adjusts the power of each BTS only if the PC bits are not identical. For example, if the BTS 106 and the BTS 108 both send identical PC bits (e.g., a +1 or a −1), then the selector 120 need not change the power level at either BTS since the balance has been maintained (e.g., either increased or decreased). However, if the PC bits are not identical, the selector 120 can send a different power command to each BTS to bring the BTSs back into balance. A simple voting procedure can be used for more than two BTSs. For example, three BTSs may send PC bits to the selector 120. If all three PC bits are identical, the selector 120 need not send any PC change commands since the power balance between the three BTSs has been maintained. However, if two BTSs record one power control command (e.g., +1) while the third BTS records a different PC bit (e.g., a −1), the selector 120 will send a power change command to the BTS having the non-matching PC bit. This embodiment allows the selector to correct power imbalances at a much higher rate than once per frame.

Figure 5:
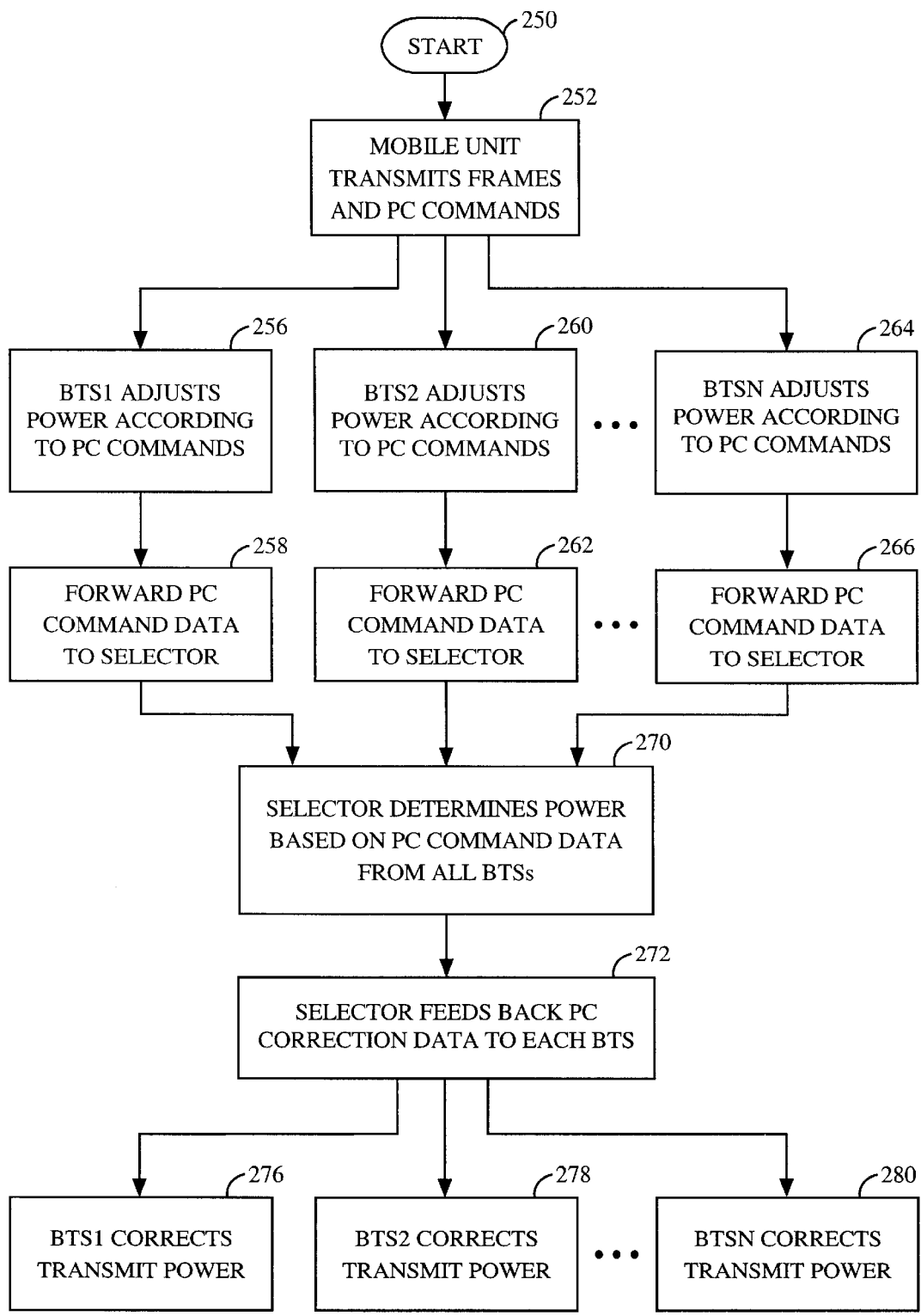
FIG. 5 is a generalized flowchart that illustrates the operation of the system with N different BTSs.

The system 100 has been described above with respect to two BTSs. The flowchart of FIGS. 4A and 4B also illustrates this operation. However, those skilled in the art will appreciate that the mobile unit 102 (see FIG. 1) may communicate with three or more BTSs during a soft handoff. FIG. 5 is a generalized flowchart that illustrates the operation of the system with N different BTSs. At a start 250 it is assumed that the mobile unit 102 is involved in a soft handoff and is thus communicating with N different BTSs. In step 252 the mobile unit 102 transmits frames and PC commands, which are received by each of the N different BTSs. As noted above, the mobile unit 102 transmits the same data frames and PC commands to all BTSs. However, due to noise, each BTS may interpret the PC commands differently. In step 256, the BTS 1 adjusts its power in accordance with the PC commands. In step 258, the BTS 1 forwards PC command data to the selector 120. Step 258 is intended to illustrate all possible forms of PC command data. As noted above, this may comprise a PC history collected over one or more data frames, a PC history for less than a full data frame, individual PC bits, or data indicative of the absolute power level of the BTS 1. Similarly, the remaining BTSs adjust each of their individual powers in accordance with the PC commands and forward the PC command data to the selector in steps 260–266.

In step 270, the selector 120 (see FIG. 1) receives the PC command data from each BTS and determines a power level based on the PC command data from all BTSs. In step 272 the selector 120 feeds back PC correction data to each BTS. It should be noted that the PC correction data is individualized for each BTS to maintain the same power levels, a fixed power offset, power ratio, or the like. In step 276, the BTS 1 corrects its transmit power in accordance with the PC correction data received from the selector. Similarly, in steps 278–280, BTS 2-BTS N correct each of their respective transmit power levels in accordance with the individualized PC correction data received from the selector.

The system 100 advantageously adjusts transmission powers such that errors in PC data from the mobile unit 102 do not result in transmitter power being sent to drastically different power levels. The system 100 can be implemented in a variety of alternative embodiments and can be readily implemented using existing infrastructure.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for power control during soft handoff of a wireless communication device, the system comprising:
   a first base station transceiver communicating with the wireless communication device and receiving data therefrom, the received data comprising a set of power control commands detected by the first base station transceiver as a first detected power command set;

a first power control history storage area to store data indicative of the first detected power control command set;

a second base station transceiver communicating with the wireless communication device and receiving data therefrom, the received data comprising the set of power control commands detected by the second base station transceiver as a second detected power command set;

a second power control history storage area to store data indicative of the second detected power control command set; and a selector to control the soft handoff from the first base station transceiver to the second base station transceiver, the selector receiving the data from the first and second power control history storage areas and calculating a power control level based on the data from at least one of the first and second power control history storage areas, the selector transmitting a power control signal, based on the calculated power control level, to the second base station transceiver to set a power level of the second base station transceiver.

2. The system of claim 1 wherein the first and second detected power command sets each comprise a plurality of detected power control commands.

3. The system of claim 1 wherein the selector adjusts the power control signal based on the data in both the first and second power control history storage areas.

4. The system of claim 1 wherein the selector transmits the power control signal as a plurality of power control commands to incrementally alter the power level of the second base station transceiver.

5. The system of claim 1 wherein the first and second power control history storage areas are associated with the second base station transceivers, respectively.

6. The system of claim 1, further including a base station controller wherein the selector is associated with the base station controller and the first and second power control history storage areas are associated with the base station controller.

7. A system for power control of a wireless communication device, the system comprising:

a first base station transceiver having a first controllable transmit power level and communicating with the wireless communication device and receiving data therefrom, the received data comprising at least one power control command detected by the first base station transceiver as at least one first detected power command;

a first power control (PC) history storage area for storing the at least one first detected power command;

a second base station transceiver having a second controllable transmit power level and communicating with the wireless communication device and receiving data therefrom, the received data comprising at least one power control command detected by the second base station transceiver as at least one second detected power command;

a second power control history storage area for storing the at least one second detected power command; and a selector to receive power command data indicative of the at least one first and second power control commands from the first and second power control history storage areas, and to generate power correction data based on the received power command data, the selector transmitting the power correction data to at least one of the first and second base station transceivers to control the controllable transmit power level thereof.

8. The system of claim 7 wherein the first and second base station transceivers detect a plurality of first and second detected power control commands, respectively, the received power command data being indicative of the plurality of first and second detected power control commands.

9. The system of claim 8 wherein the first and second base station transceivers periodically send the data in the first and second power control history storage areas to the selector.

10. The system of claim 9 wherein the selector generates the power correction data based on the plurality of first detected power control commands in the first PC history storage area and transmits the power correction data to the second base station transceiver to control the controllable power level thereof.

11. The system of claim 9 wherein the selector generates the power correction data based on a difference between the plurality of first detected power control commands in the first PC history storage area and the plurality of second detected power control commands in the second PC history storage area, the selector further transmitting first and second power correction data to the first and second base station transceivers, respectively, to control the controllable power level thereof.

12. The system of claim 7 wherein the selector generates first and second power correction data for the first and second base station transceivers, respectively, based on the received power command data and transmits the first and second power correction data to the first and second base station transceivers, respectively.

13. The system of claim 7 wherein the selector generates the power correction data to maintain the first and second controllable power levels at identical levels.

14. The system of claim 7 wherein the selector generates the power correction data to maintain the first controllable power level at a level different from the second controllable power level.

15. The system of claim 7 wherein the selector transmits the power correction data to the second base station transceiver.

16. The system of claim 15 wherein the second base station transceiver generates an internal power control command to set a power level of the second base station transceiver based on the power correction data.

17. The system of claim 7 wherein the power correction data comprises power correction commands and the second base station transceiver sets a power level of the second base station transceiver based on the power correction commands.

18. The system of claim 7 wherein the selector calculates a power control level based on the power correction data, the selector transmitting a plurality of power control commands to the first and second base station transceivers to incrementally alter a power level of the first and second base station transceivers, respectively.

19. A method for power control in a wireless communication system, the method comprising:

receiving data from a wireless communication device by a first base station transceiver, the received data comprising power control commands detected by the first base station transceiver as first detected power commands;

storing the first detected power commands in a first power control history storage area;

receiving data from a wireless communication device by a second base station transceiver, the received data comprising power control commands detected by the second base station transceiver as second detected power commands;

storing the second detected power commands in a second power control history storage area; and generating power correction data by a selector, based on the contents of at least one of the history storage areas, indicative of the first and second power control commands.

20. The method of claim 19, further comprising generating a reference power control data based on one of the data indicative of the first and second power control commands and transmitting the reference power control data to at least one of the first and second base station transceivers.

21. The method of claim 20, further comprising generating an internal power control command within each of the first and second base station transceivers to set a power level of the first and second base station transceivers, respectively, based on the reference power control data.

22. The method of claim 19 wherein the received data in the first and second base station transceivers comprises a plurality of first and second detected power commands and transmitting data to the selector comprises transmitting data indicative of the first and second pluralities of power control commands to the selector.

23. The method of claim 22, further comprising storing the plurality of first and second detected power control commands in first and second power control (PC) history storage areas associated with the first and second base station transceivers, respectively, and periodically sending the data in the first and second power control history storage areas to the selector.

24. The method of claim 23 wherein generating the power correction data is based on the plurality of first detected power control commands in the first PC history storage area, the method further comprising transmitting the power correction data to the second base station transceiver to control the controllable power level thereof.

25. The method of claim 23 wherein generating the power correction data is based on a difference between the plurality of first detected power control commands in the first PC history storage area and the plurality of second detected power control commands in the second PC history storage area, the method further comprising transmitting first and second power correction data to the first and second base station transceivers, respectively, to control the controllable power level thereof.

26. The method of claim 19, further comprising transmitting the power correction data to the second base station transceiver to set a power level of the second base station transceiver.

27. The method of claim 19, further comprising transmitting a plurality of power control commands, based on the power correction data, to the second base station transceiver to incrementally alter a power level of the second base station transceiver.

28. The method of claim 19, further comprising:

transmitting the power correction data to the second base station transceiver; and generating an internal power control command to set a power level of the second base station transceiver based on the power correction data.

29. The method of claim 19, further comprising transmitting power control signals, based on the power correction data, to the first and second base station to set a power level of the first and second base station transceivers, respectively.

30. The method of claim 19, further comprising sending the power correction data to the first base station transceiver to set the power level of the first base station transceiver at a level identical to the power level of the second base station transceiver.

31. The method of claim 19, further comprising sending the power correction data to the first base station transceiver to set the power level of the first base station transceiver at a level different from the power level of the second base station transceiver.

* * * * *